US006707375B2

(12) United States Patent
Masudaya

(10) Patent No.: US 6,707,375 B2
(45) Date of Patent: Mar. 16, 2004

(54) KEYLESS ENTRY APPARATUS CAPABLE OF SELECTIVELY CONTROLLING ONLY MEMBER TO BE CONTROLLED CLOSEST TO USER

(75) Inventor: Hideki Masudaya, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 433 days.

(21) Appl. No.: 09/797,345

(22) Filed: Mar. 1, 2001

(65) Prior Publication Data

US 2001/0028296 A1 Oct. 11, 2001

(30) Foreign Application Priority Data

Mar. 1, 2000 (JP) ....................................... 2000-056326

(51) Int. Cl.[7] ................................................ G05B 19/00

(52) U.S. Cl. ........................ 340/5.61; 340/5.2; 340/5.8; 340/5.62; 340/5.72; 340/10.3; 340/10.33; 340/426.1; 340/426.35; 340/426.36; 307/10.1; 307/10.2

(58) Field of Search ............................... 340/5.61, 5.62, 340/5.2, 5.8, 10.3, 10.33, 5.72, 5.64, 426.35, 426.36, 426.1, 426.16, 539.11; 307/10.1, 10.2

(56) References Cited

U.S. PATENT DOCUMENTS 6,208,239 B1 * 3/2001 Muller et al. .......... 340/426.35
6,552,649 B1 * 4/2003 Okada et al. ............. 340/5.61

FOREIGN PATENT DOCUMENTS

JP 11-78787 3/1999

* cited by examiner

*Primary Examiner*—Michael Horabik
*Assistant Examiner*—Yves Dalencourt
(74) *Attorney, Agent, or Firm*—Brinks Hofer Gilson & Lione

(57) ABSTRACT

A keyless entry apparatus includes an on-vehicle transmitting and receiving device mounted on a vehicle, and a portable transmitting and receiving device. The on-vehicle transmitting and receiving device has a plurality of antennas mounted close to members to be controlled of the vehicle, and a plurality of transmitting sections which are connected to the plurality of antennas and which transmit request signals having unique antenna IDs. The plurality of transmitting sections intermittently transmit request signals from the corresponding antennas. When the portable transmitting and receiving device receives any of the transmitted request signals, the portable transmitting and receiving device transmits an answer signal which controls the member to be controlled corresponding to the transmitting section which transmitted the received request signal.

8 Claims, 11 Drawing Sheets

REQUEST SIGNAL TRANSMITTED FROM ON-VEHICLE TRANSMITTING AND RECEIVING DEVICE 10

ANSWER SIGNAL TRANSMITTED FROM PORTABLE TRANSMITTING AND RECEIVING DEVICE 20

KEYLESS ENTRY APPARATUS CAPABLE OF SELECTIVELY CONTROLLING ONLY MEMBER TO BE CONTROLLED CLOSEST TO USER

BACKGROUND OF THE INVENTION

1. Field of the Invention

The present invention relates to keyless entry apparatuses, and more particularly, to a keyless entry apparatus for controlling a member to be controlled of a vehicle by an answer signal which a portable transmitting and receiving device transmits when the portable transmitting and receiving device receives a request signal transmitted from an on-vehicle transmitting and receiving device.

2. Description of the Related Art

Each of conventional keyless entry apparatuses is formed of an on-vehicle transmitting and receiving device mounted on a vehicle and a portable transmitting and receiving device carried by a user. The on-vehicle transmitting and receiving device includes one transmitting section, one transmitting antenna connected to the transmitting section, one receiving section, and one receiving antenna connected to the receiving section. Alternatively, the on-vehicle transmitting and receiving device includes one transmitting section, one receiving section, and one transmitting and receiving antenna connected to the transmitting section or to the receiving section in a switching manner.

Such conventional keyless entry apparatuses can be divided into two types in terms of their operations.

In a first type, on-vehicle transmitting and receiving apparatuses always transmit a request signal intermittently. When a user carrying a portable transmitting and receiving device come close to a vehicle and the portable transmitting and receiving device receives a request signal, the portable transmitting and receiving device transmits an answer signal in response to the request signal. When an on-vehicle transmitting and receiving device receives the answer signal, the locking section of each door of the vehicle is unlocked and the user can open and close each door.

In a second type, on-vehicle transmitting and receiving devices have a door-handle-contact detecting sensor near each door handle of vehicles. When a user carrying a portable transmitting and receiving device approaches a vehicle and contacts a door handle, an on-vehicle transmitting and receiving device transmits a request signal. When the portable transmitting and receiving device carried by the user receives the request signal, the portable transmitting and receiving device transmits an answer signal in response to the request signal. When the on-vehicle transmitting and receiving device receives the answer signal, the locking section of each door of the vehicle is unlocked and the user can open and close each door.

Therefore, the user can open and close any door without unlocking the locking section of each door of a vehicle by using the door key.

The conventional keyless entry apparatuses have an advantage that the user can open and close any door when the user carries a portable transmitting and receiving device and just approaches a vehicle or approaches the vehicle and touches a door handle. Since the locking sections of all the doors of a vehicle are unlocked when the on-vehicle transmitting and receiving device receives an answer signal which the portable transmitting and receiving signal sends in response to a received request signal, a malicious third party can get into the vehicle from a door, such as the door at the seat next to the driver's seat, at the side opposite the side where the user is located, such as the driver's side because it is difficult for the user to see the third party. This is not preferred in terms of crime prevention.

Especially in the conventional first-type keyless entry apparatuses, when the user approaches a vehicle and is located at a certain distance from the vehicle, for example, at a five-meter distance, even if the user cannot see the vehicle, a request signal and an answer signal are transmitted and received, and the locking section of each door is unlocked. Therefore, it is highly possible that the above-described incident happens.

In the conventional keyless entry apparatuses, when the user approaches a vehicle and is located at a certain distance from the vehicle, even if not the locking section of each door of the vehicle but the locking section of a truck is controlled, a request signal and an answer signal are transmitted and received as described above, and the locking section of the trunk is unlocked. Therefore, anybody can open the trunk until the user reaches the trunk, and this is not preferred either in terms of crime prevention.

SUMMARY OF THE INVENTION

The present invention has been made in consideration of the above-described technical background. Accordingly, it is an object of the present invention to provide a keyless entry apparatus for selectively controlling only a member to be controlled located closest to the user when the user approaches a vehicle and a request signal and an answer signal are transmitted and received.

Another object of the present invention is to provide a keyless entry apparatus for controlling such that, when the user approaches a vehicle, a request signal and an answer signal are transmitted and received, and the user touches the handle of the door specified by the answer signal, only the door can be selectively opened and closed.

One of the foregoing objects of the present invention is achieved in one aspect of the present invention through the provision of a keyless entry apparatus including an on-vehicle transmitting and receiving device mounted on a vehicle; and a portable transmitting and receiving device, wherein the on-vehicle transmitting and receiving device includes a plurality of antennas mounted correspondingly to members to be controlled of the vehicle, and a transmitting section which is connected to the plurality of antennas and which transmits a plurality of request signals having unique antenna IDs; the transmitting section transmits the plurality of request signals through the corresponding antennas; and when the portable transmitting and receiving device receives any of the transmitted request signals, the portable transmitting and receiving device transmits an answer signal which controls the member to be controlled corresponding to the antenna which transmitted the received request signal.

According to the keyless entry apparatus, the on-vehicle transmitting and receiving device includes an antenna and a transmitting section for each member to be controlled of a vehicle, a unique ID is assigned to each antenna, the on-vehicle transmitting and receiving device intermittently transmits the same number of request signals having different IDs as that of antennas, and when the portable transmitting and receiving device receives a request signal transmitted from the antenna closest to the portable transmitting and receiving device, the portable transmitting and receiving device transmits an answer signal which specifies the member to be controlled corresponding to the received request signal. When the on-vehicle transmitting and receiving device receives the answer signal, only the member to be controlled specified by the answer signal is controlled, and the other members to be controlled are not controlled. Therefore, the vehicle is effectively prevented from being used by a third party.

One of the foregoing objects of the present invention is achieved in another aspect of the present invention through the provision of a keyless entry apparatus including an on-vehicle transmitting and receiving device mounted on a vehicle; and a portable transmitting and receiving device, wherein the on-vehicle transmitting and receiving device includes a plurality of antennas mounted correspondingly to members to be controlled of the vehicle, a transmitting section which is connected to the plurality of antennas and which transmits a plurality of request signals having unique antenna IDs, and a door-handle-contact detecting section disposed at each door of the vehicle; the transmitting section transmits the plurality of request signals through the corresponding antennas; when the portable transmitting and receiving device receives any of the transmitted request signals, the portable transmitting and receiving device transmits an answer signal which controls the member to be controlled corresponding to the antenna which transmitted the received request signal; and when the on-vehicle transmitting and receiving device receives the answer signal, only if the member to be controlled specified by the answer signal is the locking section of any door and the door-handle-contact detecting section of the door corresponding to the answer signal outputs a contact detecting signal, the on-vehicle transmitting and receiving device unlocks the door.

According to the keyless entry apparatus, the on-vehicle transmitting and receiving device includes an antenna, each door has a door-handle-contact detecting section, a unique ID is assigned to each antenna, the on-vehicle transmitting and receiving device transmits the same number of request signals having different IDs as that of antennas, and when the portable transmitting and receiving device receives a request signal transmitted from the antenna closest to the portable transmitting and receiving device, the portable transmitting and receiving device transmits an answer signal which specifies the member to be controlled corresponding to the received request signal. When the on-vehicle transmitting and receiving device receives the answer signal, if the member to be controlled specified by the answer signal is the door closest to the portable transmitting and receiving device, and the user touches the handle of the door, only the locking section of the door is unlocked and the locking sections of the other doors are not unlocked. Therefore, the vehicle is completely prevented from being used by a third party.

The members to be controlled may include the locking section of each door and the locking section of a trunk in the vehicle.

In such a configuration, the locations of the members to be controlled in the vehicle are appropriately apart. Even when an antenna is disposed close to each member to be controlled, ranges in which request signals transmitted from the antennas can reach overlap a little.

It is preferred that the plurality of antennas be divided into two groups and the request signals be transmitted at different timing between the groups.

In this case, it is be possible that the transmitting section includes a plurality of transmitting units, and at least one of the transmitting units is shared by two antennas.

In such a configuration, when the plurality of transmitting units transmit request signals, the interference of the request signals is reduced and the request signals have high quality. When a plurality of transmitting units are shared by two antennas, the number of transmitting units to be used is reduced.

It is also preferred that the request signals be low-frequency signals.

In such a configuration, a range in which a transmitted request signal can reach is restricted. Therefore, the portable transmitting and receiving device which is relatively apart from the vehicle unpreparedly receives a request signal in reduced cases. The overlapping area of a zone in which a transmitted request signal can reach and a zone in which another transmitted request signal can reach is reduced.

DESCRIPTION OF THE PREFERRED EMBODIMENTS

Figure 1:
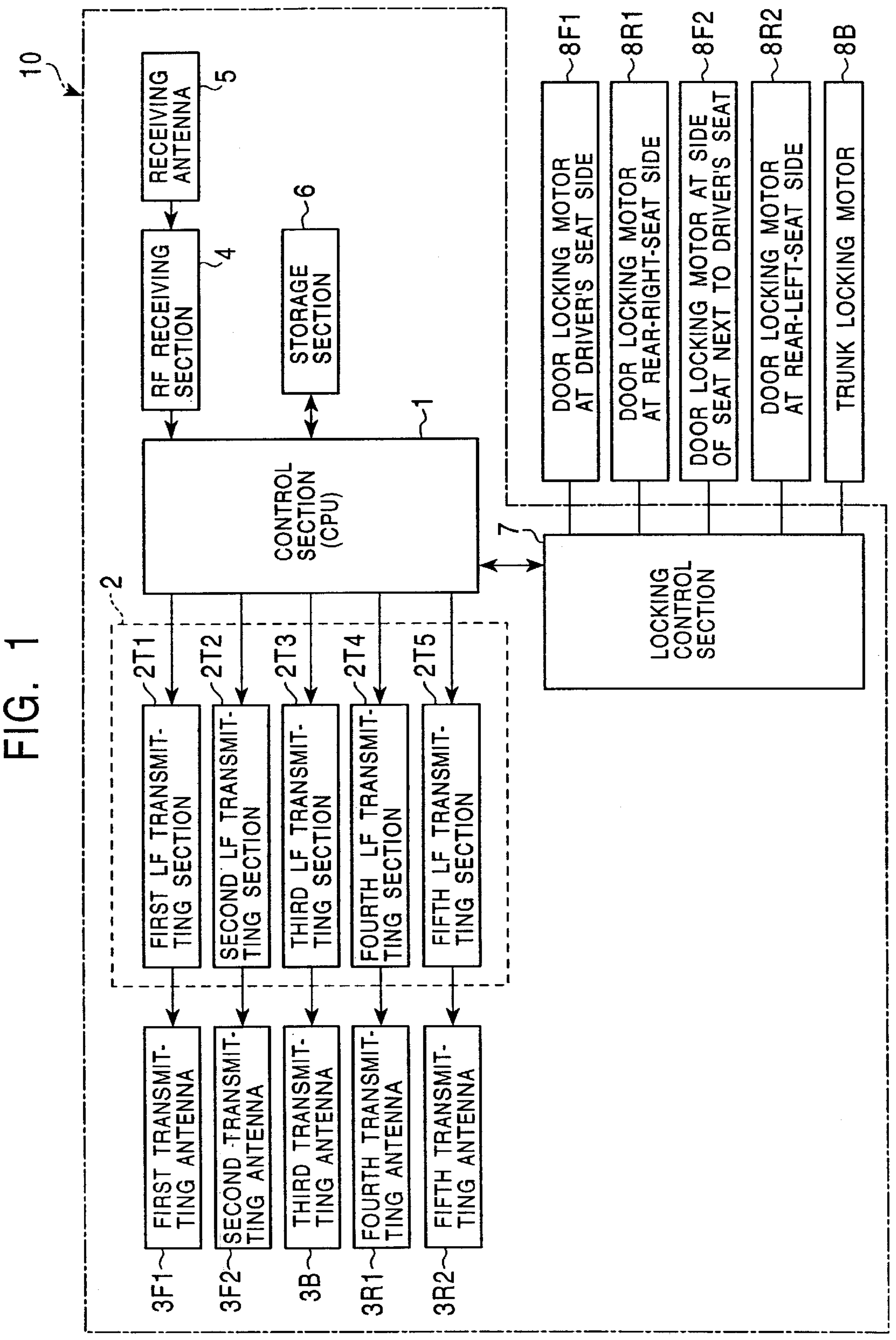
FIG. 1 is a block diagram of a keyless entry apparatus according to an embodiment of the present invention, and shows an example structure of an on-vehicle transmitting and receiving device.

Embodiments of the present invention will be described below by referring to the drawings.

Figure 2:
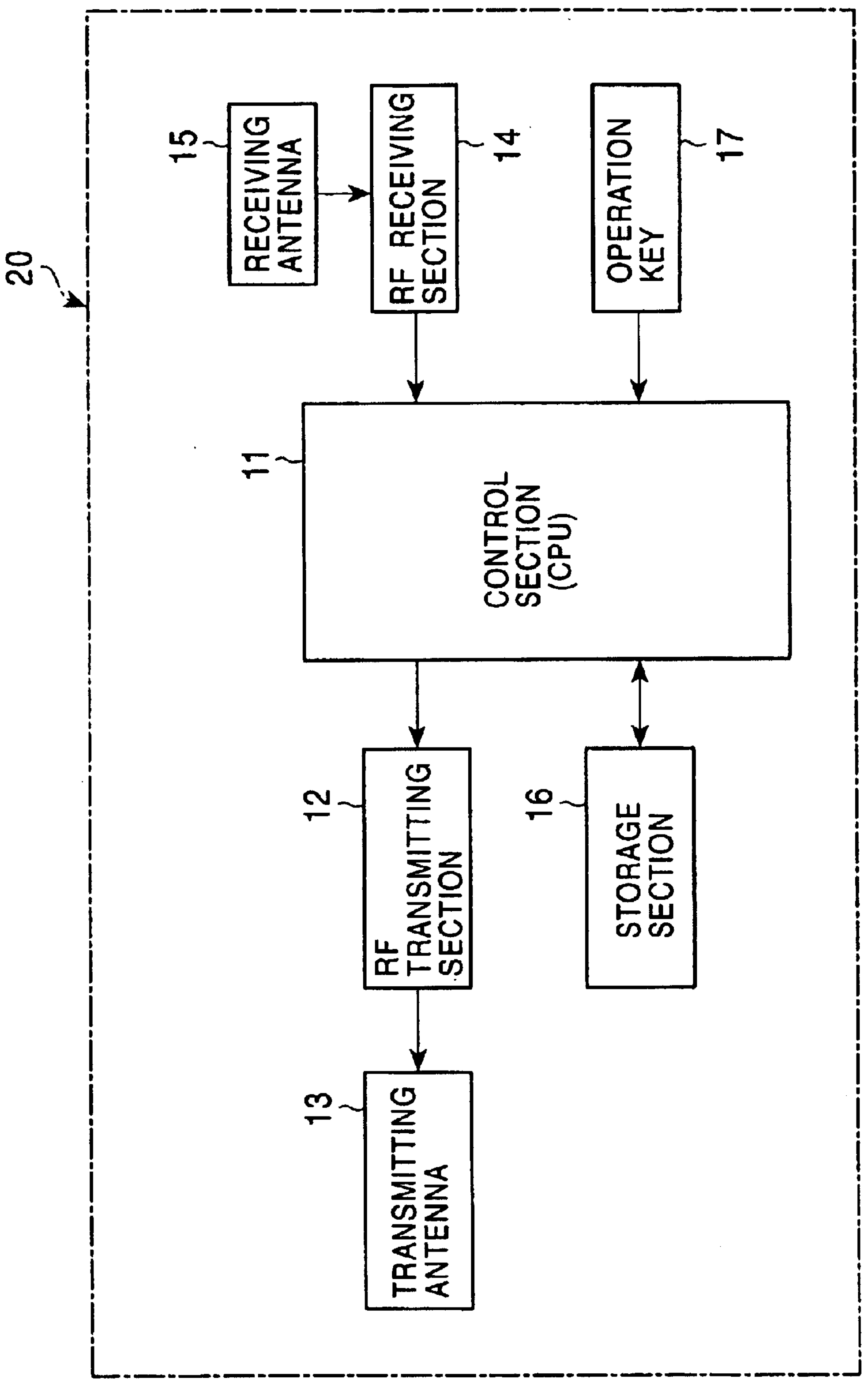
FIG. 2 is a block diagram of the keyless entry apparatus according to the embodiment of the present invention, and shows an example structure of a portable transmitting and receiving device.

FIG. 1 and FIG. 2 are block diagrams of a keyless entry apparatus according to an embodiment of the present invention. FIG. 1 shows an example structure of an on-vehicle transmitting and receiving device. FIG. 2 shows an example structure of a portable transmitting and receiving device.

As shown in FIG. 1, the on-vehicle transmitting and receiving device 10 is formed of a control section (CPU) 1, a first low-frequency-signal (LF) transmitting section 2T1, a second low-frequency-signal (LF) transmitting section 2T2, a third low-frequency-signal (LF) transmitting section 2T3, a fourth low-frequency-signal (LF) transmitting section 2T4, a fifth low-frequency-signal (LF) transmitting section 2T5, a first transmitting antenna 3F1, a second transmitting antenna 3F2, a third transmitting antenna 3B, a fourth transmitting antenna 3R1, a fifth transmitting antenna 3R2, a high-frequency-signal (RF) receiving section 4, a receiving antenna 5, a storage section 6, and a locking control section 7.

In this case, as described later, the first transmitting antenna 3F1 is disposed on the rear surface of an outside door mirror placed at the side of the driver's seat, and the second transmitting antenna 3F2 is disposed on the rear surface of an outside door mirror placed at the side of the seat next to the driver's seat. The third transmitting antenna 3B is disposed in a vicinity of the locking section of the trunk. The fourth transmitting antenna 3R1 is disposed in a vicinity of the handle of the door of the rear right seat, and the fifth transmitting antenna 3R2 is disposed in a vicinity of the handle of the door of the rear left seat. The receiving antenna 5 is disposed at any place of the vehicle, for example, at the inside ceiling of the vehicle.

In this case, the first low-frequency-signal transmitting section 2T1 to the fifth low-frequency-signal transmitting section 2T5 collectively constitute a transmitting section 2.

The first low-frequency-signal transmitting section 2T1 is connected to the control section 1 at the input end, and is connected to the first transmitting antenna 3F1 at the output end. The second low-frequency-signal transmitting section 2T2 is connected to the control section 1 at the input end, and is connected to the second transmitting antenna 3F2 at the output end. The third low-frequency-signal transmitting section 2T3 is connected to the control section 1 at the input end, and is connected to the third transmitting antenna 3B at the output end. The fourth low-frequency-signal transmitting section 2T4 is connected to the control section 1 at the input end, and is connected to the fourth transmitting antenna 3R1 at the output end. The fifth low-frequency-signal transmitting section 2T5 is connected to the control section 1 at the input end, and is connected to the fifth transmitting antenna 3R2 at the output end. The high-frequency-signal receiving section 4 is connected to the receiving antenna 5 at the input end, and is connected to the control section 1 at the output end. The storage section 6 is selectively connected to the control section 1. The locking control section 7 is connected to the control section 1, and is also connected to a door locking motor 8F1 disposed at the side of the driver's seat, to a door locking motor 8R1 disposed at the side of the rear right seat, to a door locking motor 8F2 disposed at the side of the seat next to the driver's seat, to a door locking motor 8R2 disposed at the side of the rear left seat, and to a trunk locking motor 8B.

Different IDs (identification symbols) are assigned to the first transmitting antenna 3F1, the second transmitting antenna 3F2, the third transmitting antenna 3B, the fourth transmitting antenna 3R1, and the fifth transmitting antenna 3R2. A request signal transmitted from any of the first to fifth low-frequency-signal transmitting sections 2T1 to 2T5 includes the ID of the antenna connected to each low-frequency-signal transmitting section. When a portable transmitting and receiving section 20 receives a request signal, the portable transmitting and receiving section 20 can determine the antenna among the first to fifth antenna 3F1, 3F2, 3B, 3R1, and 3R2, through which the request signal was sent, by checking the ID included in the request signal of a received signal.

The first transmitting antenna 3F1, the second transmitting antenna 3F2, and the third transmitting antenna 3B form a first transmitting group, and the fourth transmitting antenna 3R1 and the fifth transmitting antenna 3R2 form a second transmitting group. The first to third transmitting antennas 3F1, 3F2, and 3B, belonging to the first transmitting group, intermittently transmit request signals within a first period by the first to third low-frequency-signal transmitting sections 2T1 to 2T3 connected thereto. The fourth and fifth transmitting antennas 3R1 and 3R2, belonging to the second transmitting group, intermittently transmit request signals within a second period which differs from the first period by the fourth and fifth low-frequency-signal transmitting sections 2T4 and 2T5 connected thereto. Therefore, the first transmitting group and the second transmitting group do not send intermittent request signals at the same time.

The storage section 6 stores the ID assigned to each transmitting antenna, a location code, the ID, described later, of a portable transmitting and receiving device, a function code, and others.

As shown in FIG. 2, the portable transmitting and receiving device 20 is formed of a control section (CPU) 11, a high-frequency-signal (RF) transmitting section 12, a transmitting antenna 13, a low-frequency-signal (LF) receiving section 14, a receiving antenna 15, a storage section 16, and an operation key 17. The transmitting antenna 13 and the receiving antenna 15 are built in the cabinet of the portable transmitting and receiving device 20, or connected to and disposed together with the cabinet as a unit.

The high-frequency-signal transmitting section 12 is connected to the control section 11 at the input end, and is connected to the transmitting antenna 13 at the output end. The low-frequency-signal receiving section 14 is connected to the receiving antenna 15 at the input end, and is connected to the control section 11 at the output end. The storage section 16 is selectively connected to the control section 11. The operation key is connected to the control section 11.

Figure 3:
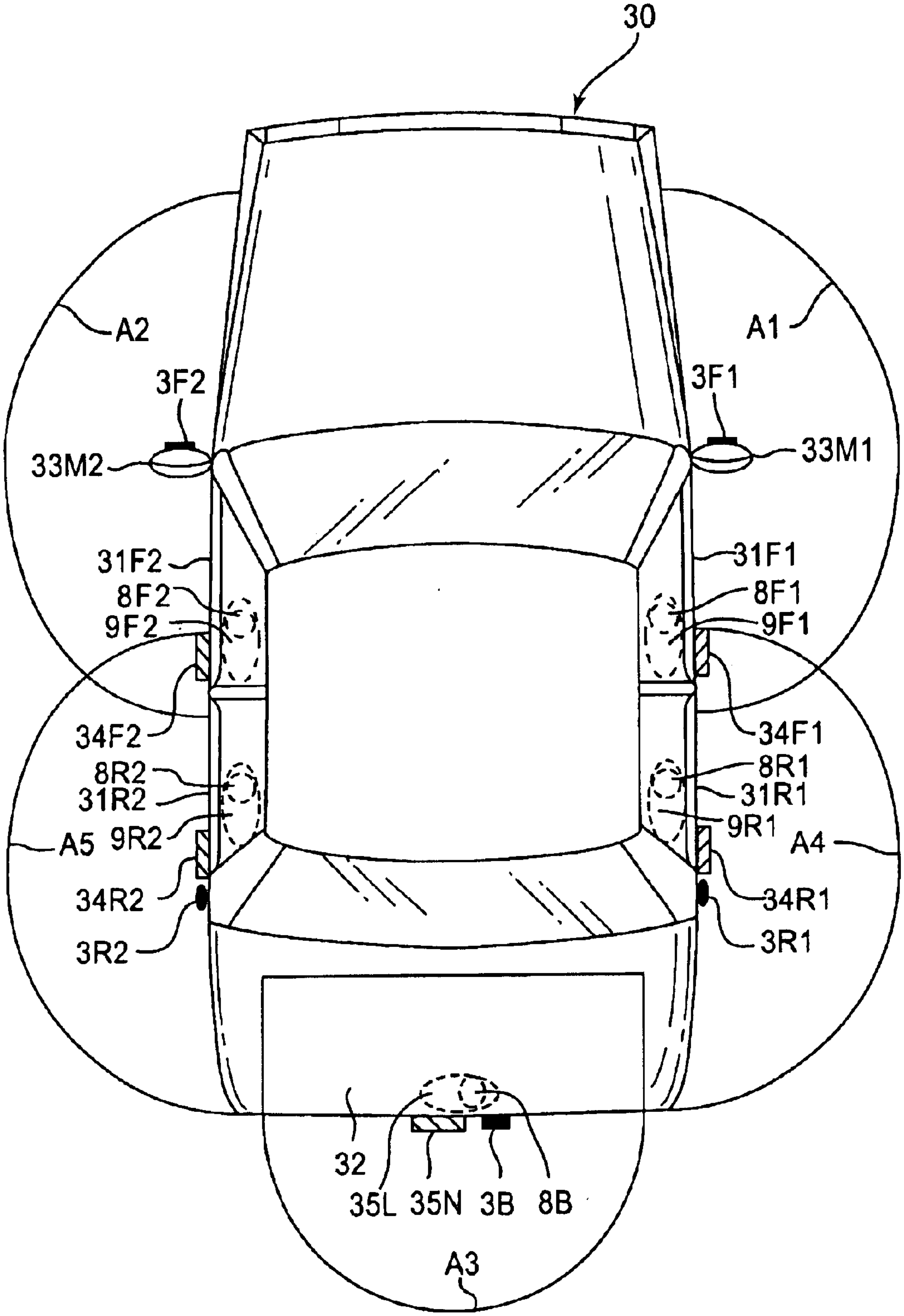
FIG. 3 is a top view of a vehicle on which the on-vehicle transmitting and receiving device according to the embodiment shown in FIG. 1 is mounted.

FIG. 3 is a top view of a vehicle on which the on-vehicle transmitting and receiving device shown in FIG. 1 according to the present embodiment is mounted.

In FIG. 3, the same symbols as those used in FIG. 1 are assigned to the same components as those shown in FIG. 1.

As shown in FIG. 3, the vehicle 30 is provided with a door 31F1 at the side of the driver's seat, a door 31F2 at the side of the seat next to the driver's seat, a door 31R1 at the side of the rear right seat, a door 31R2 at the side of the rear left seat, a trunk 32, a door mirror 33M1 at the side of the driver's seat, a door mirror 33M2 at the side of the seat next to the driver's seat, a door handle 34F1 at the side of the driver's seat, a door handle 34F2 at the side of the seat next to the driver's seat, a door handle 34R1 at the side of the rear right seat, a door handle 34R2 at the side of the rear left seat, and the handle 35N of the trunk 32.

The first transmitting antenna 3F1 is mounted and disposed on the rear surface of the door mirror 33M1 at the side of the driver's seat, and the second transmitting antenna 3F2 is mounted and disposed on the rear surface of the door mirror 33M2 at the side of the seat next to the driver's seat.

The third transmitting antenna 3B is mounted and disposed in a vicinity of the locking section 35L of the trunk 32 in line with the locking section 35L. The fourth transmitting antenna 3R1 is mounted and disposed in a vicinity of the handle 34R1 of the door for the rear right seat in line with the door handle 34R1, and the fifth transmitting antenna 3R2 is mounted and disposed in a vicinity of the handle 34R2 of the door for the rear left seat in line with the door handle 34R2.

In FIG. 3, semi-circular areas A1, A2, A3, A4, and A5 indicate areas where the portable transmitting and receiving device 20 can receive request signals sent from the first transmitting antenna 3F1, the second transmitting antenna 3F2, the third transmitting antenna 3B, the fourth transmitting antenna 3R1, and the fifth transmitting antenna 3R2, respectively, in a normal condition.

Figure 4:
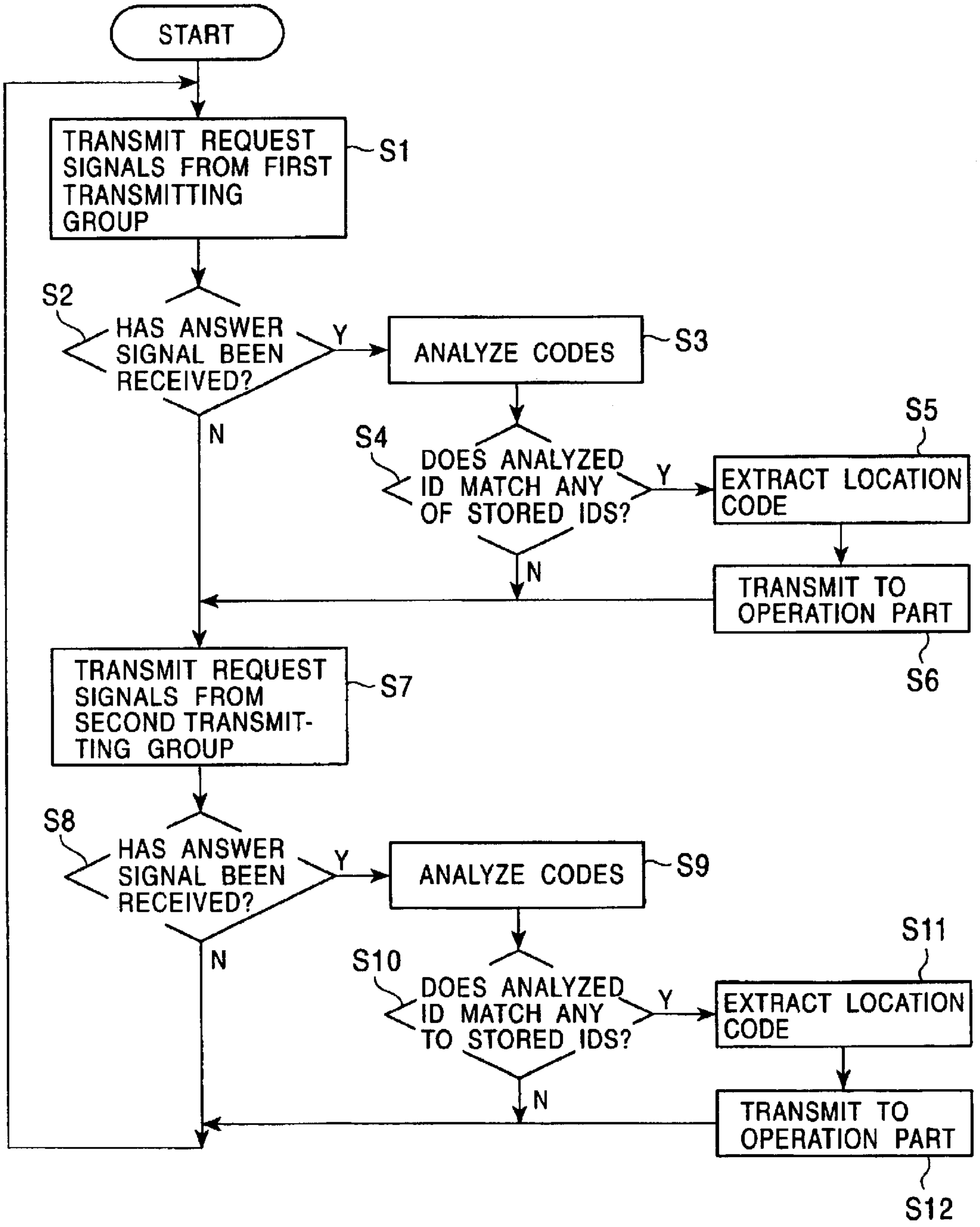
FIG. 4 is a flowchart of the main operation executed by the on-vehicle transmitting and receiving device according to the present embodiment shown in FIG. 1.
Figure 5:
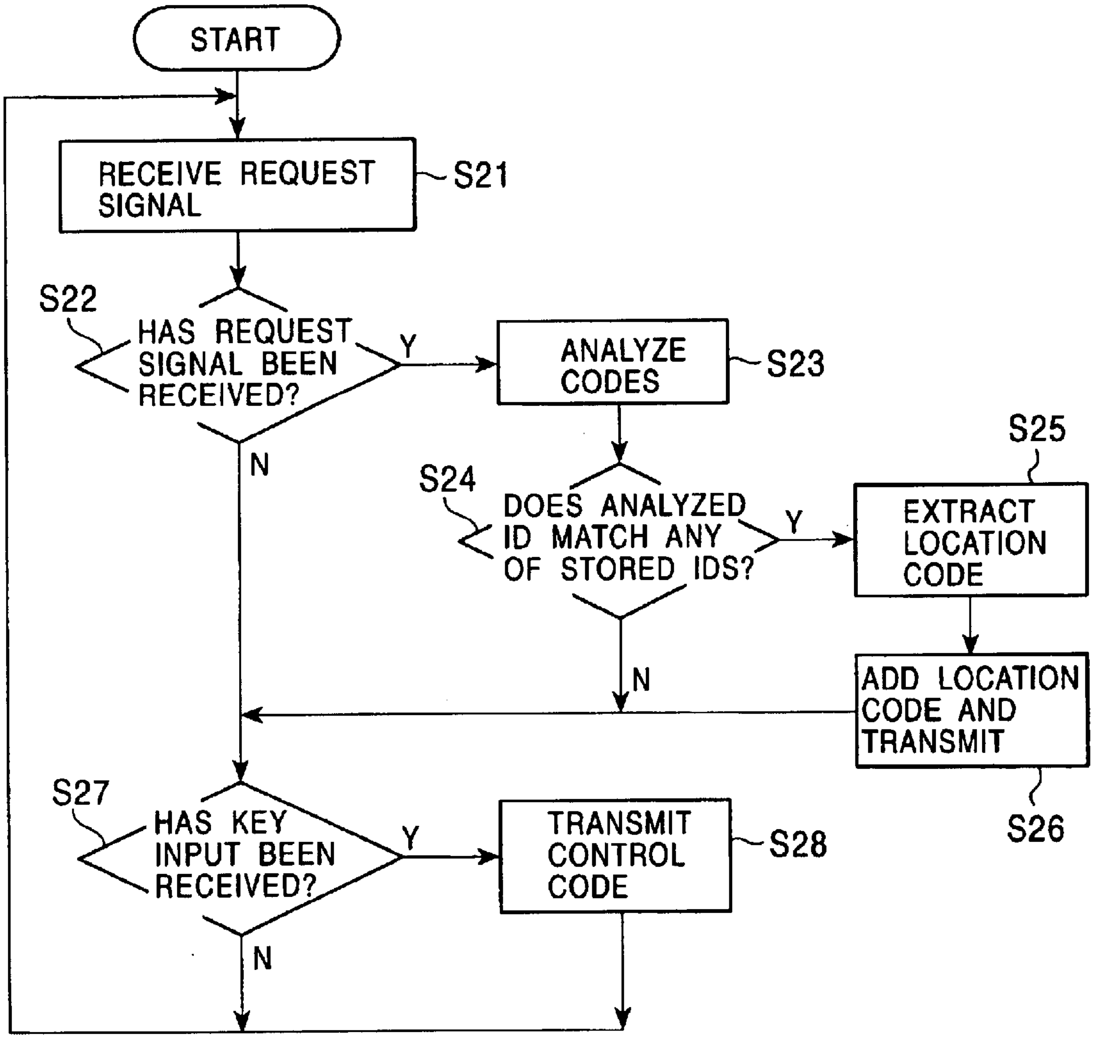
FIG. 5 is a flowchart of the main operation executed by the portable transmitting and receiving device according to the present embodiment shown in FIG. 2.

FIG. 4 is a flowchart of the main operation executed by the on-vehicle transmitting and receiving device 10 shown in FIG. 1 according to the present embodiment. FIG. 5 is a flowchart of the main operation executed by the portable transmitting and receiving device 20 shown in FIG. 2 according to the present embodiment.

Figure 6A:
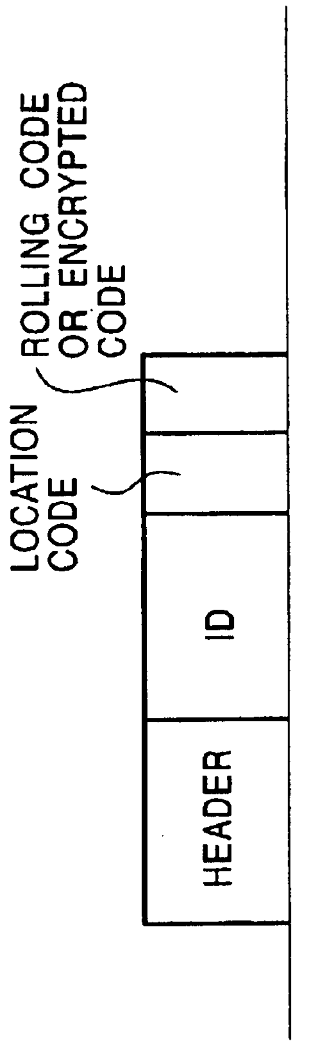
FIG. 6A and FIG. 6B are views showing example structures of a request signal and an answer signal transmitted and received between the on-vehicle transmitting and receiving device and the portable transmitting and receiving device.
Figure 6B:
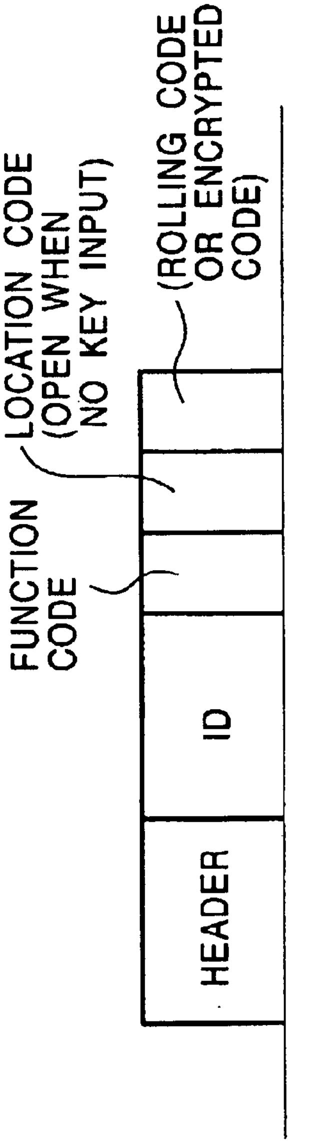

FIG. 6A and FIG. 6B are views showing example structures of a request signal and an answer signal transmitted and received between the on-vehicle transmitting and receiving device 10 and the portable transmitting and receiving device 20. FIG. 6A shows a request signal transmitted from the on-vehicle transmitting and receiving device 10, and FIG. 6B shows an answer signal transmitted from the portable transmitting and receiving device 20.

As shown in FIG. 6A, a request signal is formed of a header, an ID assigned to the antenna which transmitted the request signal, a location code which indicates a member to be controlled, and a rolling code updated every time a request signal is transmitted, in that order. As shown in FIG. 6B, an answer signal is formed of a header, an ID assigned to the portable transmitting and receiving device 20 which transmitted the answer signal, a function code which indicates a function input from the operation key 17, a location code which indicates a member to be controlled, and a rolling code updated every time an answer signal is transmitted, in that order.

The operation of the keyless entry apparatus according to the present embodiment will be described below by referring to the flowcharts shown in FIG. 4 and FIG. 5.

In the on-vehicle transmitting and receiving device 10, at a certain point of time, the first low-frequency-signal transmitting section 2T1, the second low-frequency-signal transmitting section 2T2, and the third low-frequency-signal transmitting section 2T3 connected to the first transmitting antenna 3F1, the second transmitting antenna 3F2, and the third transmitting antenna 3B, respectively, all of which belong to the first transmitting group, transmit request signals at the same time for a short period in step S1 shown in FIG. 4. In this case, the request signals transmitted from the first transmitting antenna 3F1, the second transmitting antenna 3F2, and the third transmitting antenna 3B are propagated in the areas A1, A2, and A3, respectively. Therefore, they do not interfere with each other.

When the low-frequency-signal receiving section 14 of the portable transmitting and receiving device 20 receives any of the request signals, the low-frequency-signal receiving section 14 sends the received signal to the control section 11 in step S21 shown in FIG. 5.

The control section 11 then determines in step S22 shown in FIG. 5 whether any of the request signals was received. When it is determined that a request signal was received (Yes in FIG. 5), the processing proceeds to step S23. When it is determined that a request signal is not received (No in FIG. 5), the processing proceeds to step S27.

In step S23, the control section 11 analyzes the ID, the location code, and the rolling code included in the received request signal.

Then, the control section 11 determines in step S24 whether the analyzed ID matches any of IDs stored in the storage section 16. When the analyzed ID matches one of the stored IDs (Yes in FIG. 5), the processing proceeds to step S25. When the analyzed ID does not match any of the stored IDs (No in FIG. 5), the processing proceeds to step S27. In step S25, the control section 11 extracts the analyzed location code.

Then, in step S26, the control section 11 adds the location code corresponding to the extracted location code, to an answer signal to be transmitted.

In step S27, the control section 11 determines whether a function code has been input from the operation key 17. When it is determined that a function code has been input (Yes in FIG. 5), the processing proceeds to step S28. When it is determined that a function code has not been input (No in FIG. 5), the processing returns to the first step S21, and the subsequent processes are again executed.

When it is determined in step S27 that a function code has been input, the control section 11 transmits a signal including the function code from the high-frequency-signal transmitting section 12 in step S28.

This signal is neither a request signal nor an answer signal. This signal is sent when a member to be controlled is to be controlled outside the areas where request signals can reach, if the operation key 17 of the portable transmitting and receiving device 20 is operated. The on-vehicle transmitting and receiving device 10 drives the member to be controlled in response to the signal. A description of a method therefor is omitted.

The control section 1 of the on-vehicle transmitting and receiving device 10 determines in step S2 whether the high-frequency-signal receiving section 4 received the answer signal sent in response to the transmitted request signal. When it is determined that the answer signal was received (Yes in FIG. 4), the processing proceeds to step S3. When it is determined that the answer signal has not been received (No in FIG. 4), the processing proceeds to step S7.

In step S3, the control section 1 analyzes the ID, the function code, the location code, and the rolling code included in the received answer signal.

Then, in step S4, the control section 1 determines whether the analyzed ID matches any of IDs stored in the storage section 6. When the analyzed ID matches one of the stored IDs (Yes in FIG. 4), the processing proceeds to step S5. When the analyzed ID does not match any of the stored IDs (No in FIG. 4), the processing proceeds to step S7.

In step S5, the control section 1 extracts the analyzed location code. Then, the control section 1 identifies the member to be controlled corresponding to the extracted location code, for example, the door handle 34F1 at the side of the driver's seat, and sends a function code for unlocking the door handle 34F1 to the locking control section 7 in step S6. The locking control section 7 drives the door locking motor 8F1 at the side of the driver's seat to unlock a locking section 9F1 of the door 31F1 at the side of the driver's seat.

In the on-vehicle transmitting and receiving device 10, at a point of time different from the above point of time, the fourth low-frequency-signal transmitting section 2T4 and the fifth low-frequency-signal transmitting section 2T5 connected to the fourth transmitting antenna 3R1 and the fifth transmitting antenna 3R2, respectively, which belong to the second transmitting group, transmit request signals at the same time for a short period in step S7 shown in FIG. 4. Also in this case, the request signals transmitted from the fourth low-frequency-signal transmitting section 2T4 and the fifth low-frequency-signal transmitting section 2T5 are propagated in the areas A4 and A5, respectively. Therefore, they do not interfere with each other.

When the low-frequency-signal receiving section 14 of the portable transmitting and receiving device 20 receives any of the request signals, the low-frequency-signal receiving section 14 sends the received signal to the control section 11 in step S21 shown in FIG. 5.

The portable transmitting and receiving device 20 sequentially executes the processes in step S22 to step S28 shown in FIG. 5, and transmits an answer signal from high-frequency-signal transmitting section 12.

In response to the transmission of the answer signal, the control section 1 of the on-vehicle transmitting and receiving device 10 sequentially executes the processes in steps S8 to S12 shown in FIG. 4, and analyzes the answer signal. Then, the control section 1 identifies the member to be controlled corresponding to the extracted location code, for example, the door handle 34R1 at the side of the rear right seat, and sends a function code for unlocking the door handle 34R1 to the locking control section 7 in step S12. The locking control section 7 drives the door locking motor 8R1 at the side of the rear right seat to unlock a locking section 9R1 of the door 31R1 at the side of the rear right seat.

After the above-described processes have been executed, the processing returns to the first step S1, and the subsequent processes are repeated.

In the above description, the on-vehicle transmitting and receiving device 10 unlocks the door 31F1 at the side of the driver's seat in response to the answer signal transmitted from the portable transmitting and receiving device 20, and the on-vehicle transmitting and receiving device 10 unlocks the door 31R1 at the side of the rear right seat in response to the answer signal transmitted from the portable transmitting and receiving device 20. These operations are performed because the portable transmitting and receiving device 20 receives only the request signal transmitted from the first transmitting antenna 3F1 in the former case, and the portable transmitting and receiving device 20 receives only the request signal transmitted from the fourth transmitting antenna 3R1 in the latter case. When the portable transmitting and receiving device 20 receives only a request signal transmitted from the second transmitting antenna 3F2, the on-vehicle transmitting and receiving device 10 unlocks a locking section 9F2 of the door 31F2 at the side of the seat next to the driver's seat in response to the receiving of the answer signal. When the portable transmitting and receiving device 20 receives only a request signal transmitted from the third transmitting antenna 3B, the on-vehicle transmitting and receiving device 10 unlocks the locking section 35L of the trunk 32 in response to the receiving of the answer signal. In the same way, when the portable transmitting and receiving device 20 receives only a request signal transmitted from the fifth transmitting antenna 3R2, the on-vehicle transmitting and receiving device 10 unlocks a locking section 9R2 of the door 31R2 at the side of the rear left seat in response to the receiving of the answer signal.

When the portable transmitting and receiving device 20 cannot receive any request signal even if request signals are transmitted from the first to third transmitting antennas 3F1, 3F2, and 3B at a certain point of time and other request signals are transmitted from the fourth and fifth antennas 3R1 and 3R2 at another point of time, the portable transmitting and receiving device 20 does not transmit an answer signal, and any members to be controlled are not controlled.

Figure 7:
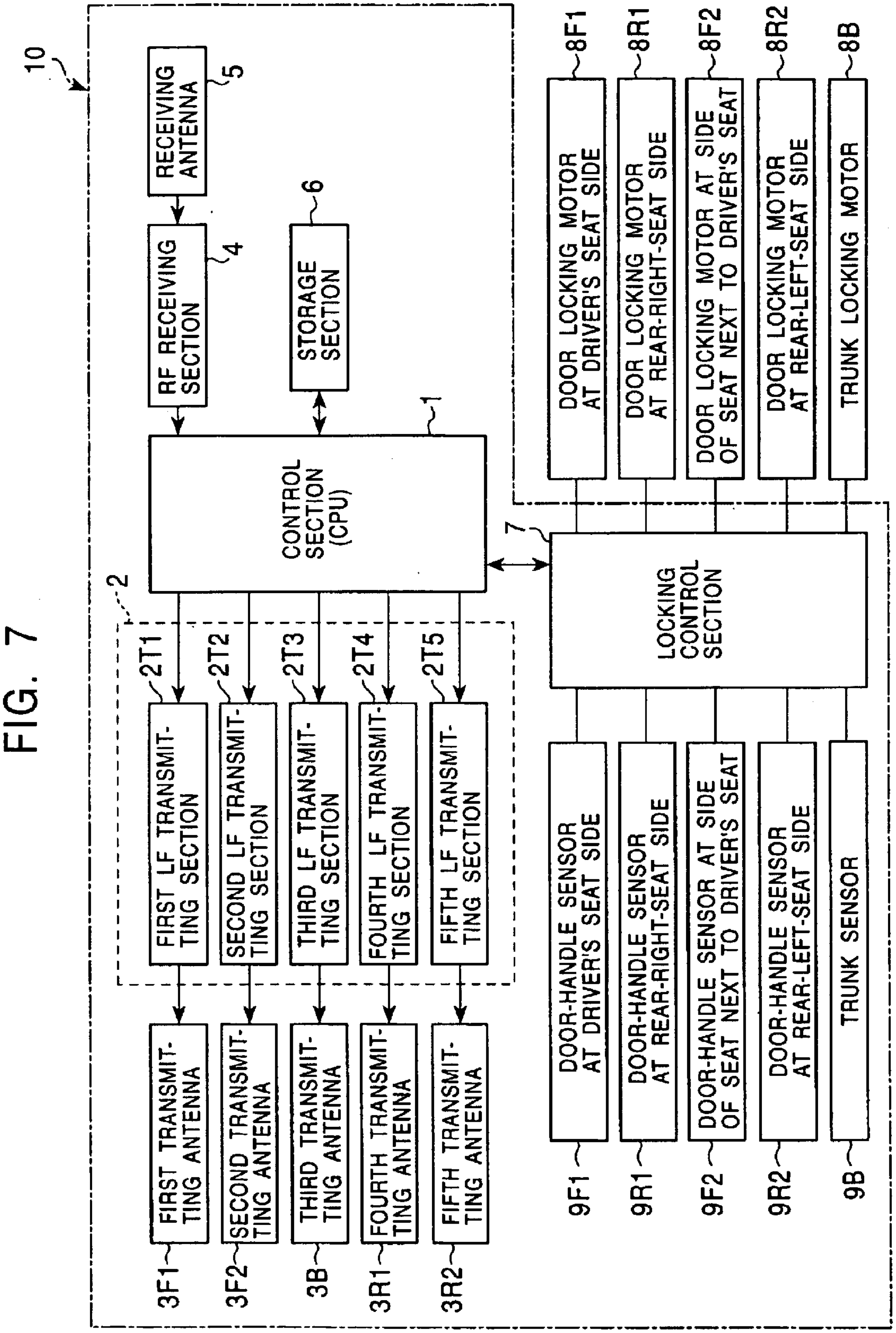
FIG. 7 is a block diagram of a keyless entry apparatus according to a second embodiment of the present invention, and shows an example structure of an on-vehicle transmitting and receiving device.

FIG. 7 is a block diagram of a keyless entry apparatus according to a second embodiment of the present invention. FIG. 7 shows an example structure of an on-vehicle transmitting and receiving device 10.

As shown in FIG. 7, the on-vehicle transmitting and receiving device 10 of the keyless entry apparatus according to the second embodiment includes a door-handle sensor 9F1 at the side of the driver's seat, a door-handle sensor 9F2 at the side of the seat next to the driver's seat, a door-handle sensor 9R1 at the side of the rear right seat, a door-handle sensor 9R2 at the side of the rear left seat, and a trunk-handle sensor 9B, in addition to all the components included in the on-vehicle transmitting and receiving device 10 shown in FIG. 1. In FIG. 7, the same symbols as those used in FIG. 1 are assigned to the same components as those shown in FIG. 1.

The door-handle sensor 9F1 at the side of the driver's seat is disposed in the door handle 34F1 at the side of the driver's seat, and is connected to a locking control section 7. The door-handle sensor 9F2 at the side of the seat next to the driver's seat is disposed in the door handle 34F2 at the side of the seat next to the driver's seat, and is connected to the locking control section 7. The door-handle sensor 9R1 at the side of the rear right seat is disposed in the door handle 34R1 at the side of the rear right seat, and is connected to the locking control section 7. The door-handle sensor 9R21 at the side of the rear left seat is disposed in the door handle 34R2 at the side of the rear left seat, and is connected to the locking control section 7. The trunk-handle sensor 9B is disposed in the trunk handle 35N, and is connected to a locking control section 7.

In the keyless entry apparatus of the second embodiment, a portable transmitting and receiving device 20 having the same structure as the portable transmitting and receiving device 20 shown in FIG. 2 is used.

Figure 8:
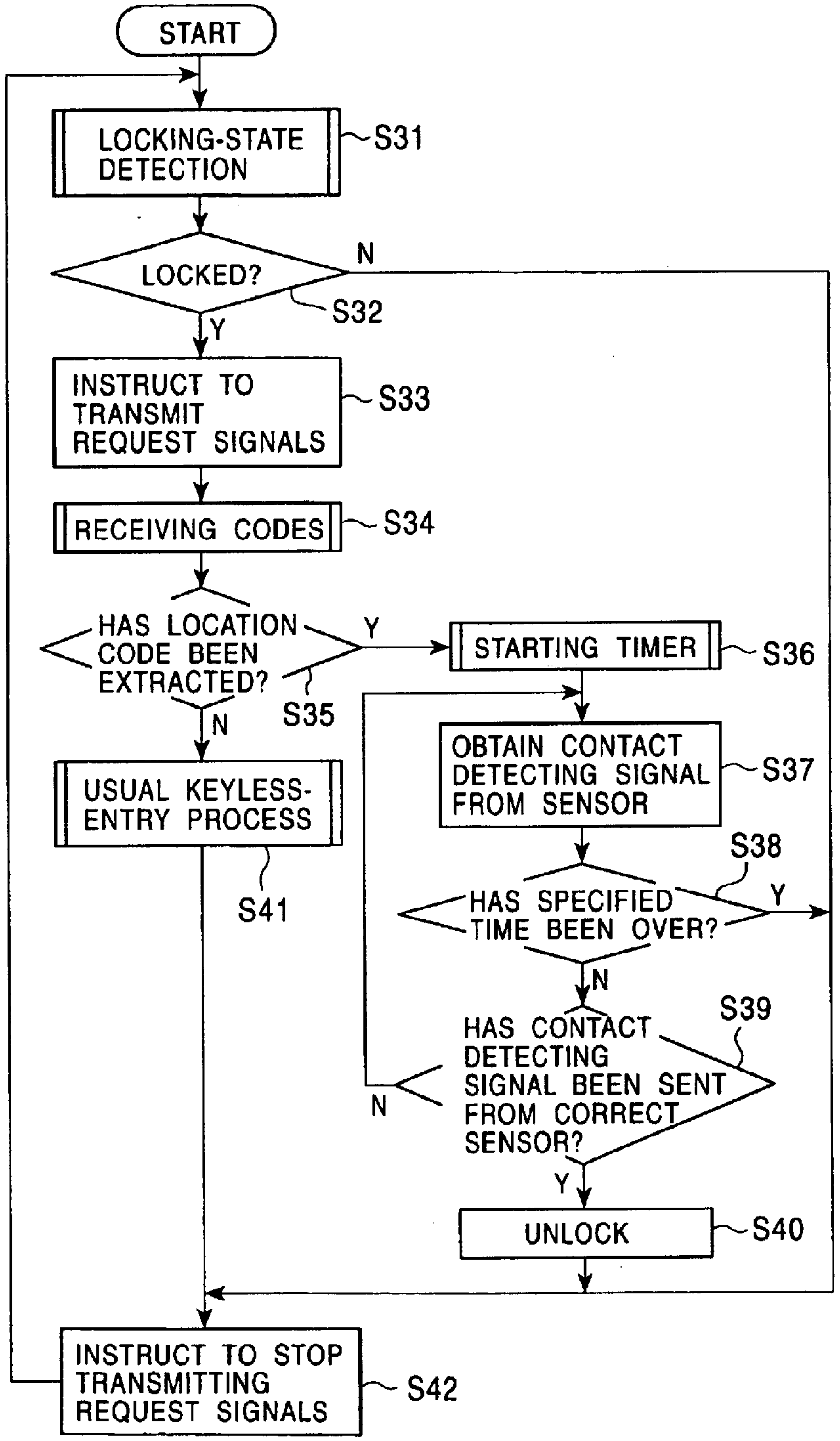
FIG. 8 is a flowchart of an example operation executed by the on-vehicle transmitting and receiving device according to the second embodiment.

FIG. 8 is a flowchart of an example operation of the on-vehicle transmitting and receiving device 10 according to the second embodiment.

The operation of the keyless entry apparatus having the above-described structure according to the second embodiment will be described next by referring to the flowchart shown in FIG. 8.

The control section 1 of the on-vehicle transmitting and receiving device 10 first detects the states of the members to be controlled corresponding to the first transmitting antenna 3F1, the second transmitting antenna 3F2, and the third transmitting antenna 3B, all of which belong to the first transmitting group, namely, the locking states of the door 31F1 at the side of the driver's seat, the door 31F2 at the side of the seat next to the driver's seat, and the trunk 32, in step S31, and determines in step S32 whether the door 31F1 at the side of the driver's seat, the door 31F2 at the side of the seat next to the driver's seat, and the trunk 32 are locked. When it is determined that all the doors are locked (Yes in FIG. 8), the processing proceeds to step S33. When it is determined that at least one of them is not locked (No), the processing proceeds to step S42.

The control section 1 instructs the first low-frequency-signal transmitting section 2T1, the second low-frequency-signal transmitting section 2T2, and the third low-frequency-signal transmitting section 2T3 connected to the first transmitting antenna 3F1, the second transmitting antenna 3F2, and the third transmitting antenna 3B, respectively, all of which belong to the first transmitting group, to transmit request signals, in step S33. The request signals are transmitted from the first transmitting antenna 3F1, the second transmitting antenna 3F2, and the third transmitting antenna 3B.

The portable transmitting and receiving device 20 executes the operation illustrated in the flowchart shown in FIG. 5, in response to the transmission of the request signals, and transmits an answer signal.

The control section 1 of the on-vehicle transmitting and receiving device 10 extracts a function code, a location code, and others from the received answer signal, in response to the transmission of the answer signal from the portable transmitting and receiving device 20, in step S34.

Then, the control section 1 determines in step S35 whether a location code has been extracted from the answer signal. When it is determined that the location code has been extracted (Yes), the processing proceeds to step S36. When it is determined that the location code has not been extracted (No), the processing proceeds to step S41.

When it is determined in step S35 that the location code has been extracted, the control section 1 starts a timer to measure a time in step S36. The control section 1 then detects a contact detecting signal sent from the sensor disposed in the member to be controlled corresponding to the extracted location code, such as the door-handle sensor 9F1 at the side of the driver's seat, in step S37.

The control section 1 determines next in step S38 whether a set time has been over. When it is determined that the set time has been over (Yes), the processing proceeds to step S42. When it is determined that the set time has not yet been over (No), the processing proceeds to step S39.

In step S39, the control section 1 determines whether a contact detecting signal detected before the time over was sent from the door-handle sensor 9F1 at the side of the driver's seat. When it is determined that the contact detecting signal was sent from the door-handle sensor 9F1 at the side of the driver's seat (Yes), the processing proceeds to step S40. When it is determined that the contact detecting signal was not sent from the door-handle sensor 9F1 at the side of the driver's seat (No), the processing returns to step S37, and the subsequent processes are repeated from the step 37.

In step S40, since it has been checked that the member to be controlled and the function specified by the answer signal are the door handle 34F1 at the side of the driver's seat and unlocking, respectively, and the contact detecting signal has been output from the door-handle sensor 9F1 at the side of the driver's seat, the control section 1 sends a control signal to the locking control section 7 to drive the door locking motor 8F1 at the side of the driver's seat through the locking control section 7 to unlock the locking section 9F1 of the door 31F1 at the side of the driver's seat.

In step S41, since a location code has not been added to the answer signal, the control section 1 achieves control without specifying a member to be controlled, for example, unlocks at the same time the door handle 34F1 at the side of the driver's seat, the door handle 34F2 at the side of the seat next to the driver's seat, the door handle 34R1 at the side of the rear right seat, and the door handle 34R2 at the side of the rear left seat. This is a usual keyless entry operation. The processes in steps S35 to S41 are performed in response to an operation on the operation key 17 of the portable transmitting and receiving device 20.

The control section 1 outputs instructions to the first to fifth low-frequency-signal transmitting sections 2T1 to 2T5 to stop transmitting request signals. The processing returns to the first step S31, and the subsequent steps are repeated.

Figure 9:
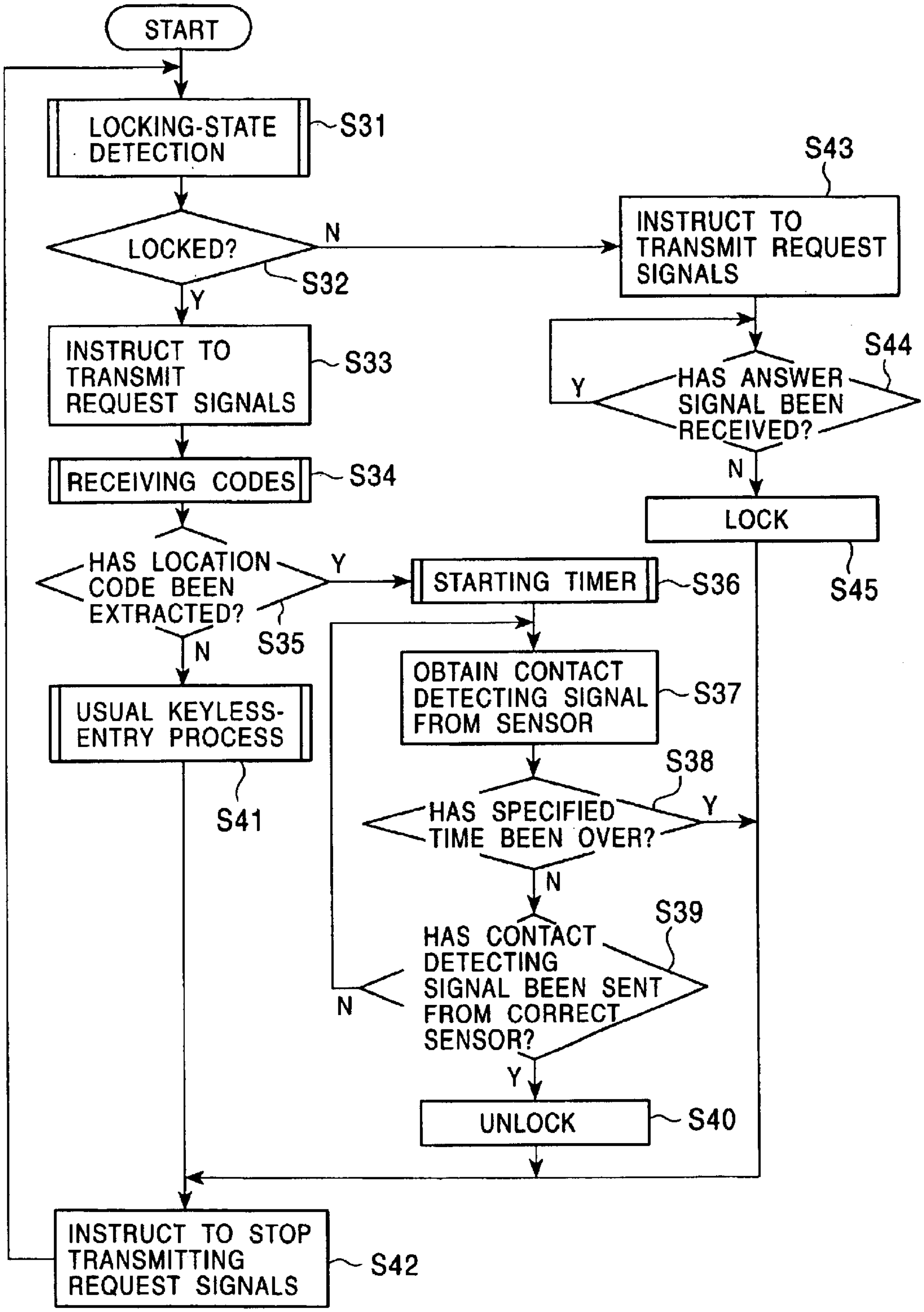
FIG. 9 is a flowchart of another example operation executed by the on-vehicle transmitting and receiving device according to the second embodiment.

FIG. 9 is a flowchart of another operation of the on-vehicle transmitting and receiving device 10 according to the second embodiment. In this operation, according to the state of a member to be controlled, the state can be changed to another state.

The operation illustrated in FIG. 9 is the same as the operation shown in the flowchart of FIG. 8, except that, when the locking state of a member to be controlled, such as the door handle 34F1 at the side of the driver's seat, was not detected in step S32, the processing does not directly proceed to step S42 but proceeds to step S42 through steps S43 to S45. In FIG. 9, the same symbols as those used in FIG. 8 are assigned to the steps having the same functions as those illustrated in the flowchart shown in FIG. 8.

In the following description, only the operation related to steps S43 to S45 will be explained. Since steps S31 to S42 have been described, a description therefor will be omitted.

Since the locking state of the door handle 34F1 at the side of the driver's seat was not detected, namely, the door handle is not locked, the control section 1 outputs instructions to the first and second low-frequency-signal transmitting sections 2T1 and 2T2 in step S43 to transmit request signals so that the door handle 34F1 at the side of the driver's seat and the door handle 34F2 at the side of the seat next to the driver's seat are locked.

In response to the transmission of the request signals, the portable transmitting and receiving device 20 transmits an answer signal. The control section 1 determines in step S44 whether the answer signal has been received. When it is determined that the answer signal has not yet been determined (No), the processing proceeds to step S45. When it is determined that the answer signal has been received (Yes), step S44 is repeated.

The control section 1 sends a control signal to the locking control section 7 in step S45 to drive the door locking motor 8F1 at the side of the driver's seat through the locking control section 7 to lock the door 31F1 at the side of the driver's seat. The processing then proceeds to step S42. The processes achieved in steps S43 to S45 are used to automatically lock the door when the user who carries the portable transmitting and receiving device 20 leaves the vehicle.

Figure 10:
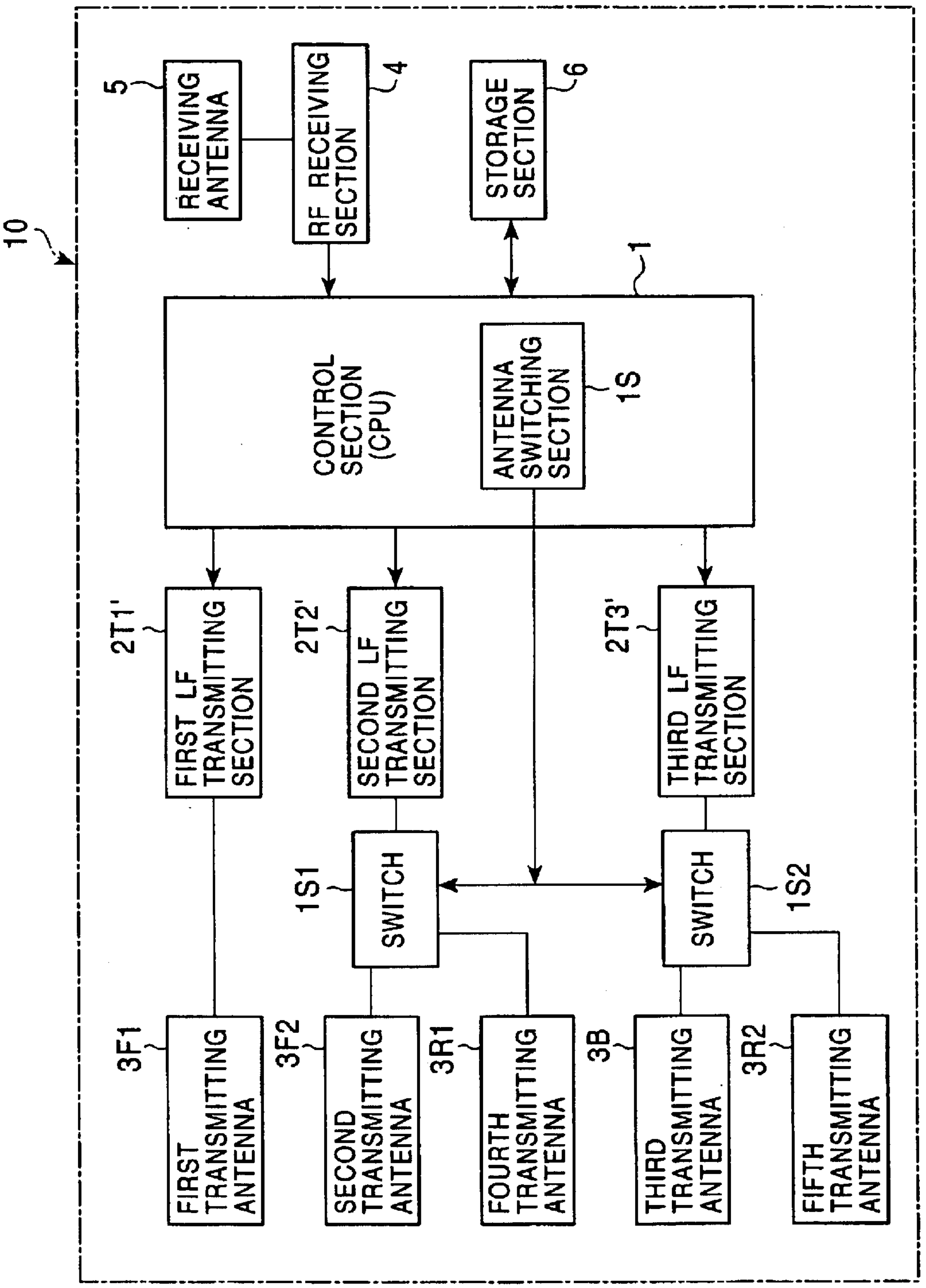
FIG. 10 is a block diagram of a keyless entry apparatus according to a third embodiment of the present invention, and shows an example structure of an on-vehicle transmitting and receiving device.

FIG. 10 is a block diagram of a keyless entry apparatus according to a third embodiment of the present invention. FIG. 10 shows an example structure of an on-vehicle transmitting and receiving device 10. The structure of a transmitting section is changed from those shown in FIG. 1 and FIG. 2.

As shown in FIG. 10, the on-vehicle transmitting and receiving device 10 of the third embodiment uses three low-frequency-signal transmitting sections, a first low-frequency-signal transmitting section 2T1', a second low-frequency-signal transmitting section 2T2', and a third low-frequency-signal transmitting section 2T3', for a first transmitting antenna 3F1, a second transmitting antenna 3F2, a third transmitting antenna 3B, a fourth transmitting antenna 3R1, and a fifth transmitting antenna 3R2. In addition, a control section 1 is provided with an antenna switching section 1S, and two switches, a first switch 1S1 and a second switch 1S2, are employed. In FIG. 10, the same symbols as those used in FIG. 1 are assigned to the same components as those shown in FIG. 1.

The first low-frequency-signal transmitting section 2T1' is connected to a control section 1 at the input end and is connected to the first transmitting antenna 3F1 at the output end. The input end of the second low-frequency-signal transmitting section 2T2' is connected to the control section 1 and the output end thereof is connected to the input end of the first switch 1S1. The input end of the third low-frequency-signal transmitting section 2T3' is connected to the control section 1 and the output end thereof is connected to the input end of the second switch 1S2. The first switch 1S1 is connected to the second transmitting antenna 3F2 at a first output end, is connected to the fourth transmitting antenna 3R1 at a second output end, and is connected to the antenna switching section 1S at a control end. The second switch 1S2 is connected to the third transmitting antenna 3B at a first output end, is connected to the fifth transmitting antenna 3R2 at a second output end, and is connected to the antenna switching section 1S at a control end.

The on-vehicle transmitting and receiving section 10 having the above structure according to the third embodiment operates in the following way.

When the low-frequency-signal transmitting sections transmit request signals through the transmitting antennas belonging to a first transmitting group, the control section 1 connects the input end of the first switch 1S1 to its first output end and connects the input end of the second switch 1S2 to its first output end so as to connect the second low-frequency-signal transmitting section 2T2' to the second transmitting antenna 3F2 and to connect the third low-frequency-signal transmitting section 2T3' to the third transmitting antenna 3B, by using the antenna switching section 1S. In this case, when the control section 1 instructs the first low-frequency-signal transmitting section 2T1', the second low-frequency-signal transmitting section 2T2', and the third low-frequency-signal transmitting section 2T3' to transmit request signals, the first low-frequency-signal transmitting section 2T1' directly sends a request signal to the first transmitting antenna 3F1, the second low-frequency-signal transmitting section 2T2' sends a request signal to the second transmitting antenna 3F2 through the first switch 1S1, and the third low-frequency-signal transmitting section 2T3' sends a request signal to the third transmitting antenna 3B through the second switch 1S2. The request signals are transmitted from the antennas 3F1, 3F2, and 3B.

When the low-frequency-signal transmitting sections transmit request signals through the transmitting antennas belonging to a second transmitting group, the control section 1 connects the input end of the first switch 1S1 to its second output end and connects the input end of the second switch 1S2 to its second output end so as to connect the second low-frequency-signal transmitting section 2T2' to the fourth transmitting antenna 3R1 and to connect the third low-frequency-signal transmitting section 2T3' to the fifth transmitting antenna 3R2, by using the antenna switching section 1S. In this case, when the control section 1 instructs the second low-frequency-signal transmitting section 2T2' and the third low-frequency-signal transmitting section 2T3' to transmit request signals, the second low-frequency-signal transmitting section 2T2' sends a request signal to the fourth transmitting antenna 3R1 through the first switch 1S1, and the third low-frequency-signal transmitting section 2T3' sends a request signal to the fifth transmitting antenna 3R2 through the second switch 1S2. The request signals are transmitted from the antennas 3R1 and 3R2.

Since the operation of the on-vehicle transmitting and receiving device 10 according to the third embodiment is the same as that of the on-vehicle transmitting and receiving device 10 of the first embodiment or the second embodiment, described above, except for the transmission of request signals from the first to third low-frequency-signal transmitting sections 2T1' to 2T3', a more detailed description will be omitted.

Figure 11:
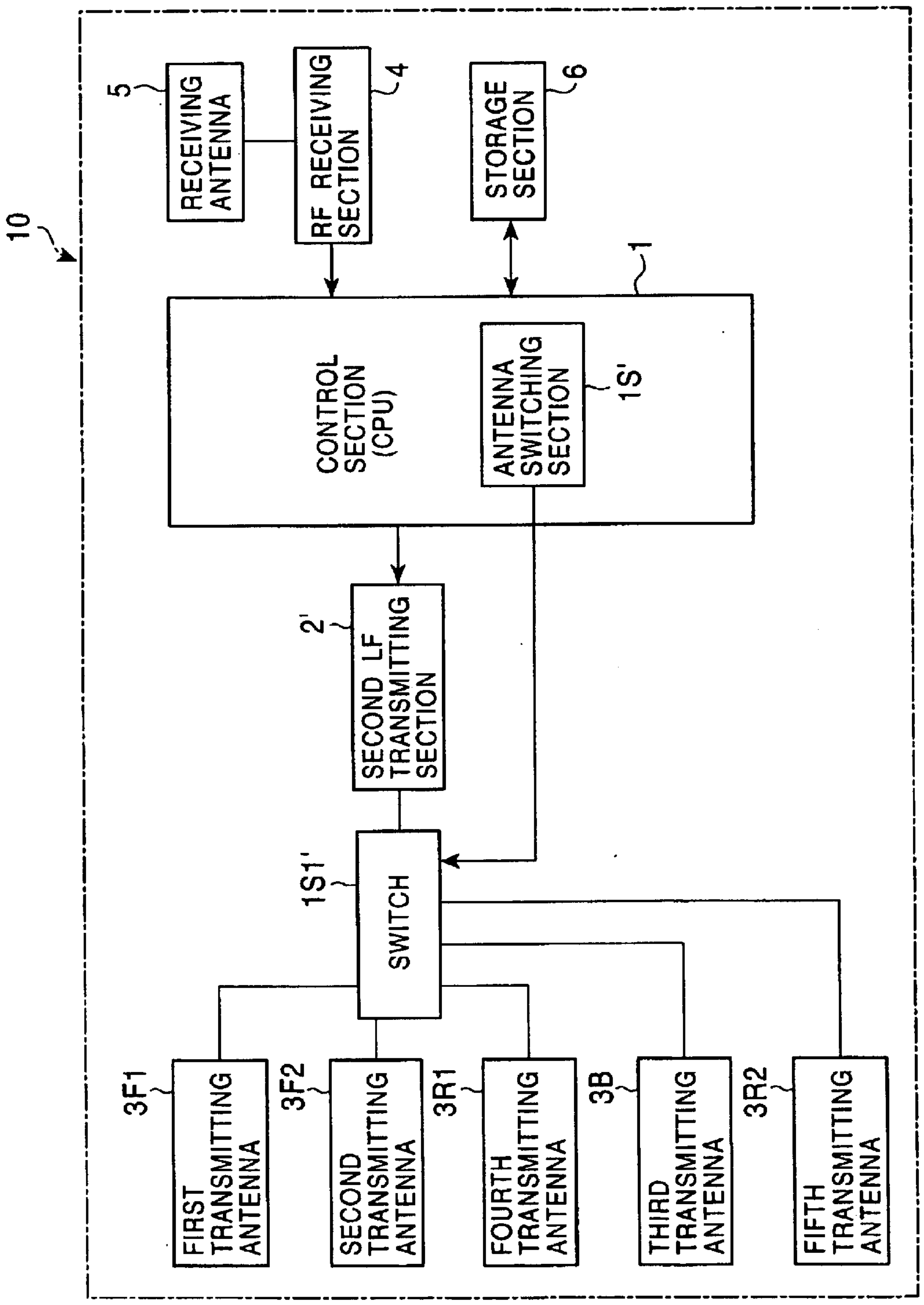
FIG. 11 is a block diagram of a keyless entry apparatus according to a fourth embodiment of the present invention, and shows an example structure of an on-vehicle transmitting and receiving device.

FIG. 11 is a block diagram of a keyless entry apparatus according to a fourth embodiment of the present invention. FIG. 11 shows another example structure of an on-vehicle transmitting and receiving device 10. The structure of a transmitting section is changed from that shown in FIG. 1.

As shown in FIG. 11, in the on-vehicle transmitting and receiving device 10 of the fourth embodiment, a first transmitting antenna 3F1, a second transmitting antenna 3F2, a third transmitting antenna 3B, a fourth transmitting antenna 3R1, and a fifth transmitting antenna 3R2 are connected to one transmitting section 2' through a switch 1S1' for switching a transmitting antenna. The transmitting section 2' is connected to a control section 1. The switch 1S1' is connected to an antenna switching section 1S' of the control section 1, and switches a transmitting antenna according to an instruction sent from the antenna switching section 1S'.

The on-vehicle transmitting and receiving device 10 having the above structure according to the fourth embodiment operates in the following way.

The control section 1 sequentially reads and combines IDs and location codes stored in the storage section 6 to generate a request signal to be transmitted from the first transmitting antenna 3F1, a request signal to be transmitted from the second transmitting antenna 3F2, a request signal to be transmitted from the third transmitting antenna 3B, a request signal to be transmitted from the fourth transmitting antenna 3R1, and a request signal to be transmitted from the fifth transmitting antenna 3R2, and sequentially sends them to the transmitting section 2' at certain time intervals. The transmitting section 2' converts the request signals to low-frequency signals and sequentially sends them to the transmitting antennas through the switch 1S1'. The transmitting section 2' sends the low-frequency signals at the same time intervals as the control section 1 sends the request signals to the transmitting section 2'. The antenna switching section 1S' in the control section 1 instructs the switch 1S1' to switch a transmitting antenna, according to the transmitting timing of the request signals from the transmitting section 2'.

Therefore, the request signal to be transmitted from the first transmitting antenna 3F1 is transmitted from the first transmitting antenna 3F1, and the other request signals are also always transmitted from the corresponding transmitting antennas. As for the certain time intervals, for example, the request signal to be transmitted from the first transmitting antenna 3F1 the request signal to be transmitted from the second transmitting antenna 3F2, and the request signal to be transmitted from the third transmitting antenna 3B are continuously transmitted at an interval of 20 ms, a period of 200 ms elapses, and then, the request signal to be transmitted from the fourth transmitting antenna 3R1 and the request signal to be transmitted from the fifth transmitting antenna 3R2 are continuously transmitted at an interval of 20 ms.

In the first embodiment, a request signal to be transmitted from the first transmitting antenna 3F1, a request signal to be transmitted from the second transmitting antenna 3F2, and a request signal to be transmitted from the third transmitting antenna 3B, in other words, request signals to be transmitted from the first-group transmitting antennas, are transmitted at the same time, and a request signal to be transmitted from the fourth transmitting antenna 3R1 and a request signal to be transmitted from the fifth transmitting antenna 3R2, in other words, request signals to be transmitted from the second-group transmitting antennas, are transmitted at the same time. In contrast, in the present embodiment, request signals are not transmitted at the same time, but continuously transmitted. Both embodiments have the same structure in which transmitting antennas are divided into two groups.

In the fourth embodiment, the operation of the portable transmitting and receiving device 20, and the operation of the on-vehicle transmitting and receiving device 10 achieved after an answer signal is received from the portable transmitting and receiving device 20 are the same as in the first embodiment. Therefore, a description thereof will be omitted.

As described above, according to the present invention, an on-vehicle transmitting and receiving device includes an antenna and a transmitting section for each member to be controlled of a vehicle, a unique ID is assigned to each transmitting section, the on-vehicle transmitting and receiving device intermittently transmits the same number of request signals having different IDs as that of transmitting sections, and when a portable transmitting and receiving device receives a request signal transmitted from the antenna closest to the portable transmitting and receiving device, the portable transmitting and receiving device transmits an answer signal which specifies the member to be controlled corresponding to the received request signal. When the on-vehicle transmitting and receiving device receives the answer signal, only the member to be controlled specified by the answer signal, that is, the member to be controlled disposed closest to the portable transmitting and receiving device, is controlled, and other members to be controlled are not controlled. Therefore, the present invention provides an advantage that the vehicle is effectively prevented from being used by a third party.

In addition, according to the present invention, an on-vehicle transmitting and receiving device includes an antenna and a transmitting section for each member to be controlled of a vehicle, each door has a door-handle-contact detecting section, a unique ID is assigned to each transmitting section, the on-vehicle transmitting and receiving device transmits the same number of request signals having different IDs as that of transmitting sections, and when a portable transmitting and receiving device receives a request signal transmitted from the antenna closest to the portable transmitting and receiving device, the portable transmitting and receiving device transmits an answer signal which specifies the member to be controlled corresponding to the received request signal. When the on-vehicle transmitting and receiving device receives the answer signal, if the member to be controlled specified by the answer signal is the door closest to the portable transmitting and receiving device, and the user touches the handle of the door, only the locking section of the door is unlocked and the locking sections of the other doors are not unlocked. Therefore, the present invention provides an advantage that the vehicle is completely prevented from being used by a third party.

What is claimed is:

1. A keyless entry apparatus comprising:

an on-vehicle transmitting and receiving device mounted on a vehicle; and a portable transmitting and receiving device, wherein the on-vehicle transmitting and receiving device comprises a plurality of antennas mounted correspondingly to members to be controlled of the vehicle, and a transmitting section which is connected to the plurality of antennas and which transmits a plurality of request signals having unique antenna IDs;

the transmitting section transmits the plurality of request signals through the corresponding antennas; and when the portable transmitting and receiving device receives any of the transmitted request signals, the portable transmitting and receiving device transmits an answer signal which controls the member to be controlled corresponding to the antenna which transmitted the received request signal; and wherein the plurality of antennas are divided into two groups and the request signals are transmitted at different timing between the groups.

2. A keyless entry apparatus according to claim 1, wherein the members to be controlled includes a locking section of each door and a locking section of a trunk in the vehicle.

3. A keyless entry apparatus according to claim 1, wherein the transmitting section includes a plurality of transmitting units, and at least one of the transmitting units is shared by two antennas.

4. An keyless entry apparatus according to claim 1, wherein the request signals are low-frequency signals.

5. A keyless entry apparatus comprising:

an on-vehicle transmitting and receiving device mounted on a vehicle; and a portable transmitting and receiving device, wherein the on-vehicle transmitting and receiving device comprises a plurality of antennas mounted correspondingly to members to be controlled of the vehicle, a transmitting section which is connected to the plurality of antennas and which transmits a plurality of request signals having unique antenna IDs, and a door-handle-contact detecting section disposed at each door of the vehicle;

the transmitting section transmits the plurality of request signals through the corresponding antennas;

when the portable transmitting and receiving device receives any of the transmitted request signals, the portable transmitting and receiving device transmits an answer signal which controls the member to be controlled corresponding to the antenna which transmitted the received request signal; and when the on-vehicle transmitting and receiving device receives the answer signal, only if the member to be controlled specified by the answer signal is a locking section of any door and the door-handle-contact detecting section of a door corresponding to the answer signal outputs a contact detecting signal, the on-vehicle transmitting and receiving device unlocks the door corresponding to the answer signal; and wherein the plurality of antennas are divided into two groups and the request signals are transmitted at different timing between the groups.

6. A keyless entry apparatus according to claim 5, wherein the members to be controlled includes the locking section of each door and a locking section of a trunk in the vehicle.

7. A keyless entry apparatus according to claim 5, wherein the transmitting section includes a plurality of transmitting units, and at least one of the transmitting units is shared by two antennas.

8. An keyless entry apparatus according to claim 5, wherein the request signals are low-frequency signals.

* * * * *